United States Patent
Emelyanenko

(10) Patent No.: US 12,346,721 B2
(45) Date of Patent: Jul. 1, 2025

(54) METHODS AND ELECTRONIC DEVICES FOR BATCHING REQUESTS FOR PROCESSING BY A PROCESSING UNIT

(71) Applicant: YANDEX EUROPE AG, Lucerne (CH)

(72) Inventor: Dmitry Viktorovich Emelyanenko, d. Goluboye (RU)

(73) Assignee: Y.E. Hub Armenia LLC, Yerevan (AM)

( * ) Notice: Subject to any disclaimer, the term of this patent is extended or adjusted under 35 U.S.C. 154(b) by 700 days.

(21) Appl. No.: 17/735,256

(22) Filed: May 3, 2022

(65) Prior Publication Data

US 2023/0127306 A1 Apr. 27, 2023

(30) Foreign Application Priority Data

Oct. 21, 2021 (RU) .......................... RU2021130744

(51) Int. Cl.
*G06F 9/46* (2006.01)
*G06F 9/48* (2006.01)

(52) U.S. Cl.
CPC .................. *G06F 9/4806* (2013.01)

(58) Field of Classification Search
CPC .................................................. G06F 9/4806
See application file for complete search history.

(56) References Cited

U.S. PATENT DOCUMENTS

| | | | |
|---|---|---|---|
| 6,880,028 B2 | 4/2005 | Kurth | |
| 8,745,418 B2 | 6/2014 | Morris | |
| 9,146,690 B2 | 9/2015 | Zhu et al. | |
| 10,180,940 B2 | 1/2019 | Jiang et al. | |
| 11,010,103 B2 | 5/2021 | Pyati et al. | |
| 11,416,374 B1 * | 8/2022 | Wu | G06F 11/3636 |
| 2005/0198636 A1 | 9/2005 | Barsness et al. | |

(Continued)

FOREIGN PATENT DOCUMENTS

| | | |
|---|---|---|
| CN | 102819460 B | 5/2015 |
| CN | 107515860 A | 12/2017 |

(Continued)

OTHER PUBLICATIONS

Vaswani et al., "Attention Is All You Need", 31st Conference on Neural Information Processing Systems (NIPS 2017), pp. 1-15.

(Continued)

*Primary Examiner* — Tammy E Lee
(74) *Attorney, Agent, or Firm* — BCF LLP

(57) ABSTRACT

Methods and electronic devices for batching requests for processing by a processing unit are disclosed. The method includes acquiring a queue of requests to be processed and executing a current iteration for a given batch of requests including the given request from the queue. During the current iteration, the method includes determining a first cost value of adding a first candidate request from the queue to the given batch, determining a second cost value of adding a second candidate request from the queue to the given batch, and selectively adding a target request amongst the first candidate request and the second candidate request to the given batch. The target request being associated with a lowest one of the first cost value and the second cost value.

20 Claims, 5 Drawing Sheets

(56) References Cited

U.S. PATENT DOCUMENTS

| | | | |
|---|---|---|---|
| 2015/0254288 A1* | 9/2015 | Garth | G06F 9/5005 |
| | | | 707/753 |
| 2017/0083845 A1 | 3/2017 | Karcher et al. | |
| 2017/0163543 A1 | 6/2017 | Wang et al. | |
| 2018/0247265 A1 | 8/2018 | Huang et al. | |
| 2019/0384765 A1 | 12/2019 | White et al. | |
| 2022/0382975 A1* | 12/2022 | Gu | G06F 40/216 |
| 2022/0383624 A1* | 12/2022 | Delbom | G06V 10/82 |
| 2023/0030265 A1* | 2/2023 | Fang | G06N 3/08 |

FOREIGN PATENT DOCUMENTS

| | | |
|---|---|---|
| JP | 4723260 B2 | 7/2011 |
| RU | 2632140 C2 | 10/2017 |
| WO | 2020087655 A1 | 5/2020 |

OTHER PUBLICATIONS

Li et al., "Jasper: An End-to-End Convolutional Neural Acoustic Model", arXiv:1904.03288, Aug. 27, 2019, 5 pages.

Chan et al., "Listen, Attend, and Spell", arXiv:1508.01211, Aug. 20, 2015, pp. 1-16.

Devlin, "BERT: Pre-training of Deep Bidirectional Transformers for Language Understanding", arXiv:1810.04805, May 24, 2019, 16 pages.

Shen et al., "Natural TTS Synthesis by Conditioning Wavenet on Mel Spectrogram Predictions", arXiv:1712.05884, Feb. 16, 2018, 5 pages.

Arnab et al., "ViViT: A Video Vision Transformer", arXiv:2103.15691, Mar. 29, 2021, 14 pages.

English Abstract for CN107515860 retrieved on Espacenet on May 1, 2022.

English Abstract for CN102819460 retrieved on Espacenet on May 1, 2022.

Russian Search Report dated Oct. 18, 2023 issued in respect of the counterpart Russian Patent Application No. RU 2021130744.

* cited by examiner

METHODS AND ELECTRONIC DEVICES FOR BATCHING REQUESTS FOR PROCESSING BY A PROCESSING UNIT

CROSS-REFERENCE

The present application claims priority to Russian Patent Application No. 2021130744, entitled "Methods and Electronic Devices for Batching Requests for Processing by a Processing Unit," filed on Oct. 21, 2021, the entirety of which is incorporated herein by reference.

FIELD

The present technology relates to deep learning in general and, specifically, to methods and electronic devices for batching requests for processing by a processing unit.

BACKGROUND

Deep learning (also known as deep structured learning) is part of a broader family of machine learning methods based on artificial neural networks with representation learning. Learning can be supervised, semi-supervised or unsupervised.

The term "deep" in deep learning refers to the use of multiple layers in the network. Deep learning is concerned with designing networks with an unbounded number of layers of bounded size, which permits various practical applications. In deep learning, the layers are also permitted to be heterogeneous and to deviate widely from biologically informed connectionist models. Therefore, a Deep Neural Network (DNN) is an artificial neural network with multiple layers between the input and output layers and which consist of the following components: neurons, synapses, weights, biases, and functions.

In one simplified example, a DNN that is trained to recognize dog breeds will go over the given image and may calculate the probability that the dog in the image is a certain breed. A human assessor can review the results and select which probabilities the network should display (above a certain threshold, etc.) and return the assessed label. Each mathematical manipulation as such is considered a layer, and complex DNNs have many layers, hence the name "deep" networks.

Deep learning architectures vary greatly based on specific implementations and the task at hand.

For instance, some DNNs are feedforward networks in which data flows from the input layer to the output layer without looping back. At first, the DNN creates a map of virtual neurons and assigns random numerical values, or "weights", to connections between them. The weights and inputs are multiplied and return an output between 0 and 1. If the network did not accurately recognize a particular pattern, an algorithm would adjust the weights. That way the algorithm can make certain parameters more influential, until it determines the correct mathematical manipulation to fully process the data.

In another instance, some DNNs are called Recurrent neural networks (RNNs) in which data can flow in any direction. Long Short-Term Memory (LSTM) networks are a specific type of RNNs. LSTMs have feedback connections and can process not only single data points (such as images), but also entire sequences of data (such as speech or video). For example, LSTMs can be trained in a supervised fashion on a set of training sequences using an optimization algorithm, such as gradient descent, combined with backpropagation through time to compute the gradients needed during the optimization process. This allows to change weights of the LSTM network in proportion to the derivative of the error (at the output layer of the LSTM) with respect to corresponding weights.

In a further instance, some DNNs are called Convolutional Neural Networks (CNNs) which are networks that employ a mathematical operation called "convolution". CNNs are a specialized type of neural networks in which the hidden layers include layers that perform convolutions. Typically, this involves a layer that performs a dot product of the convolution kernel with the layer's input matrix. As the convolution kernel slides along the input matrix for the layer, the convolution operation generates a feature map, which in turn contributes to the input of the next layer. This is followed by other layers such as pooling layers, fully connected layers, and normalization layers. CNNs are often used in computer vision but are also be applied to acoustic modeling for speech recognition.

Deep learning architectures have been applied to multiple fields of technology including computer vision, speech recognition, natural language processing, word/sentence embedding, machine translation, bioinformatics, drug design, medical image analysis, material inspection, and the like.

In the recent years, advances in both machine learning algorithms and computer hardware have led to more efficient methods for training DNNs that contain many layers of non-linear hidden units and very large output layers. For that reason, Graphic Processing Units (GPUs) are now widely used for training such networks, and sometimes are preferred to Central Processing Units (CPUs).

Deep learning systems can be challenging to deploy at scale. Large DNNs are computationally expensive, and some network architectures are more easily deployed than others. Some solutions are directed to grouping requests for processing which can allow parallel processing of these requests.

U.S. Pat. No. 11,010,103 teaches a balancing routine for the processing of tasks relating to restoring files from a backup storage. These tasks are divisible tasks.

SUMMARY

Developers of the present technology have appreciated certain technical drawbacks associated with existing solutions for deploying Deep Neural Networks (DNNs). It is an object of the present technology to ameliorate at least some of the inconveniences present in the prior art.

Developers of the present technology have realized that DNNs can have different architectures and can be employed for a large variety of applications.

In some embodiments of the present technology, the DNN may be implemented as a "transformer" model based on an attention mechanism. In these embodiments, the DNN may be used for translation applications. In these embodiments, the architecture of the DNN may be similar to architectures disclosed in an article entitled "*Attention Is All You Need*", authored by Ashish Vaswani et al., published on Dec. 6, 2017, the contents of which is incorporated herein by reference in its entirety.

In other embodiments of the present technology, the DNN may be implemented as an End-to-End (E2E) Convolutional Neural Network (CNN). In these embodiments, the DNN may be used for building a speech recognition model. In these embodiments, the architecture of the DNN may be similar to architectures disclosed in an article entitled "*Jas-

*per: An End-to-End Convolutional Neural Acoustic Model*", authored by Jason Li et al., published on Aug. 27, 2019, the contents of which is incorporated herein by reference in its entirety.

In further embodiments of the present technology, the DNN may be implemented as a network having two components, namely a "listener" and a "speller". The listener can be a pyramidal recurrent network encoder that accepts filter bank spectra as inputs. The speller can be an attention-based recurrent network decoder that emits characters as outputs. In these embodiments, the DNN may be used for speech recognition. In these embodiments, the architecture of the DNN may be similar to architectures disclosed in an article entitled "*Listen, Attend, and Spell*", authored by William Chan et al., published on Aug. 20, 2015, the contents of which is incorporated herein by reference in its entirety.

In additional embodiments of the present technology, the DNN may be implemented as a particular transformed-based model called Bidirectional Encoder Representations from Transformers (BERT). Such a model may be designed to pre-train deep bidirectional representations from unlabeled text by jointly conditioning on both left and right context in all layers. In these embodiments, the DNN may be used for text analysis and search-related applications. In these embodiments, the architecture of the DNN may be similar to architectures disclosed in an article entitled "*BERT: Pre-training of Deep Bidirectional Transformers for Language Understanding*", authored by Jacob Devlin et al., published on May 24, 2019, the contents of which is incorporated herein by reference in its entirety.

In yet further embodiments of the present technology, the DNN may be implemented as a network having a recurrent sequence-to-sequence feature prediction model that maps character embeddings to mel-scale spectrograms, followed by a WaveNet model acting as a vocoder to synthesize time-domain waveforms from those spectrograms. In these embodiments, the DNN may be used for speech synthesis applications. In these embodiments, the DNN may be used for speech synthesis. In these embodiments, the architecture of the DNN may be similar to architectures disclosed in an article entitled "*Natural TTS Synthesis By Conditioning Wavenet On Mel Spectrogram Predictions*", authored by Jonathan Shen et al., published on Feb. 16, 2018, the contents of which is incorporated herein by reference in its entirety.

In yet additional embodiments of the present technology, the DNN may be implemented as a transformer-based model configured to extract and process spatiotemporal tokens from an input video. In these embodiments, the DNN may be used for video classification applications. In these embodiments, the DNN may be used for speech synthesis. In these embodiments, the architecture of the DNN may be similar to architectures disclosed in an article entitled "*ViViT: A Video Vision Transformer*", authored by Anurag Arnab et al., published on Mar. 29, 2021, the contents of which is incorporated herein by reference in its entirety.

Broadly speaking, DNNs can receive inputs for generating outputs. A given input into the DNN can be a respective sequence of input "tokens". The nature of these tokens depends on inter alia the architecture of the DNN and the specific application for which this DNN is employed.

For example, when the DNN is used in translation applications, a given input token may be representative of a sub-sentence unit (e.g., words) and/or a sub-word unit (e.g., phonemes) of the sentence in the source language. However, this may not be the case in each and every implementation of the present technology. In another example, when the DNN is used for speech synthesis applications, a given input token may be representative of at least a portion of a spectrogram (e.g., a temporal segment of the spectrogram) based on which the DNN is to generate speech. In an additional example, when the DNN is used for speech recognition applications, a given input token may be representative of at least a portion of an audio file based on which the DNN is to generate a textual representation of a human utterance. In a further example, when the DNN is used for computer vision, a given input token may be representative of an image frame from a video file based on which the DNN is to make predictions.

Irrespective of a specific application, it can be said that a given token inputted into the DNN is in a sense a "unit of processing" for the DNN. It should also be noted that DNNs may be configured to receive inputs of different lengths, meaning that two different inputs into DNN may have different numbers of input tokens.

For the sake of clarity, let's take a non-limiting example of a DNN used for translation purposes. Such a DNN may have an encoder portion associated with a source language and a decoder portion associated with a target language. Broadly speaking, the encoder portion receives a sequence of input tokens generated based on text in the source language and produces a compact representation of that input sequence, trying to summarize or condense all of its information. These compact representations are received by the decoder portion, and the decoder portion generates a sequence of output tokens based on the inputs received. In this example, a sequence of input tokens may represent a sentence and/or word in a source language and the sequence of outputs tokens may represent a sentence and/or word in a target language. Naturally, due to a variety of possible sentences and/or words, two sequences of input tokens may contain different numbers of input tokens (sub-sentence units and/or sub-word units).

Similarly, inputs into DNNs used for speech synthesis, speech recognition, computer vision, and the like, may also have different lengths (different numbers of input tokens). Indeed, a DNN used for speech recognition may process audio files of different time lengths, a DNN used for computer vision may process video files with different numbers of frames, and so forth.

It should be noted that when an input is provided to a DNN, a "request" for processing is generated by an electronic device and may be queued for processing by a "processing unit". Broadly speaking, a processing unit is a hardware component of the electronic device that is configured to perform operations which result in the application of the DNN model onto data. In other words, processing of a given request by a processing unit results in the application of the DNN on the input for generating an output.

In some embodiments of the present technology, the processing unit may be embodied as a Central Processing Unit (CPU). In other embodiments of the present technology, the processing unit may be embodied as a Graphics Processing Unit (GPU). In further embodiments, the processing unit may be embodied as one or more CPUs and/or one or more GPUs.

Akin to CPUs, GPUs can be optimized for training (and/or inference) deep learning models as they can process multiple computations simultaneously. They can have a large number of cores, which allows for better computation of multiple parallel processes. Additionally, computations in deep learning need to handle large amounts of data—this makes a GPU's memory bandwidth most suitable. There are a few deciding parameters to determine whether to use a CPU or a GPU to train a deep learning model, including memory bandwidth, dataset size, task optimization, and the like. It can be said that the electronic device including the processing unit may be a computer system configured to execute deep learning algorithms.

Developers of the present technology have realized that grouping requests from a queue and providing them to the processing unit in "batches" may reduce the total processing time of these requests by the processing unit and, therefore, potentially improve the throughput. It can be said that a batch is a group of requests that may be processed simultaneously.

It should be noted that in the context of the present technology, a given request can be said to be "indivisible" meaning that the tokens in the given request need to be processed as a whole by the processing unit and cannot be in a sense "split" into two or more sub-requests, since they represent a common input into the DNN and can only be processed as a whole.

It should also be noted that since not all requests have a same length (i.e., do not all include a same number of tokens), some of the requests must be "padded" with additional tokens for ensuring that all requests in a given batch have the same length. For example, null tokens may be added to a given request in a batch so that the given request has the same length as all other requests in that batch.

In the context of the present technology, developers have devised a specific batching algorithm for grouping requests from a queue of requests into respective batches. During the batching process as envisioned in the context of the present technology, requests from a queue are selectively, and iteratively, added into a batch in a manner that may allow reducing an average processing time of requests and/or the average processing time of batches.

In a first broad aspect of the present technology, there is provided a method of batching requests for processing by a processing unit. The method is executable by an electronic device. The method comprises acquiring, by the electronic device, a queue of requests to be processed by the processing unit. A given request has a number of tokens. The number of tokens defines a length of the given request. The number of tokens in the given request are to be processed as a whole by the processing unit. The method comprises executing, by the electronic device, a current iteration for a given batch of requests including the given request from the queue. The given request has been previously added to the given batch. The executing the current iteration includes determining a first cost value of adding a first candidate request from the queue to the given batch. The first cost value is indicative of a number of padding tokens that are to be added to the given batch for ensuring that all requests in the given batch have a same length if the first candidate request is added to the given batch. The executing the current iteration includes determining a second cost value of adding a second candidate request from the queue to the given batch. The second cost value is indicative of a number of padding tokens that are to be added to the given batch for ensuring that all requests in the given batch have the same length if the second candidate request is added to the given batch. The executing the current iteration includes selectively adding, by the electronic device, a target request amongst the first candidate request and the second candidate request to the given batch. The target request is associated with a lowest one of the first cost value and the second cost value.

In some embodiments of the method, the given batch has a current batch length during the current iteration, and where the current batch length is a largest length amongst all requests having been added to the given batch in at least one iteration prior to current iteration.

In some embodiments of the method, a length of the first candidate request is shorter than the current batch length, and where the first cost value is equal to a difference between the length of the first candidate request and the current batch length.

In some embodiments of the method, a length of the first candidate request is longer than the current batch length, and where the first cost value is equal to a difference between the length of the first candidate request and the current batch length multiplied by a current number of requests in the given batch.

In some embodiments of the method, the method further comprises executing a next iteration for the given batch of requests including the given request and the target request from the queue.

In some embodiments of the method, the method further comprises executing a pre-determined number of iterations for the given batch of requests.

In some embodiments of the method, the method further comprises stopping iterative addition of requests from the queue to the given batch in response to a stopping condition being met.

In some embodiments of the method, the method further comprises sending the given batch of requests to the processing unit for processing.

In some embodiments of the method, the method further comprises generating a next batch of requests from the queue for processing, and where the next batch of requests excludes requests from the given batch.

In some embodiments of the method, the padding tokens are null tokens.

In some embodiments of the method, the electronic device includes the processing unit.

In some embodiments of the method, the processing unit is at least one of a Central Processing Unit (CPU) and a Graphics Processing Unit (GPU).

In some embodiments of the method, the given request represents a sequence of tokens to be used for training a Deep Neural Network (DNN).

In some embodiments of the method, the given request in the queue represents an input sequence of tokens to be processed by a Sequence-to-Sequence (Seq2Seq) model for generating an output sequence of tokens.

In some embodiments of the method, the DNN is at least one of: a transformer-based model, an End-to-End Convolutional Neural Network (E2E-CNN), a Bidirectional Encoder Representations from Transformers (BERT) model, and a Long Short-Term Memory (LSTM) model.

In a second broad aspect of the present technology, there is provided an electronic device for batching requests for processing by a processing unit. The electronic device is configured to acquire a queue of requests to be processed by the processing unit. A given request has a number of tokens, the number of tokens defining a length of the given request. The number of tokens in the given request are to be processed as a whole by the processing unit. The electronic device is configured to execute a current iteration for a given batch of requests including the given request from the queue. The given request has been previously added to the given batch. To execute the current iteration the electronic device is configured to determine a first cost value of adding a first candidate request from the queue to the given batch. The first cost value is indicative of a number of padding tokens that are to be added to the given batch for ensuring that all requests in the given batch have a same length if the first candidate request is added to the given batch. To execute the current iteration the electronic device is configured to determine a second cost value of adding a second candidate request from the queue to the given batch. The second cost value is indicative of a number of padding tokens that are to be added to the given batch for ensuring that all requests in the given batch have the same length if the second candidate request is added to the given batch.

To execute the current iteration the electronic device is configured to selectively add a target request amongst the first candidate request and the second candidate request to the given batch. The target request is associated with a lowest one of the first cost value and the second cost value.

In some embodiments of the electronic device, the given batch has a current batch length during the current iteration, and where the current batch length is a largest length amongst all requests having been added to the given batch in at least one iteration prior to current iteration.

In some embodiments of the electronic device, a length of the first candidate request is shorter than the current batch length, and where the first cost value is equal to a difference between the length of the first candidate request and the current batch length.

In some embodiments of the electronic device, a length of the first candidate request is longer than the current batch length, and where the first cost value is equal to a difference between the length of the first candidate request and the current batch length multiplied by a current number of requests in the given batch.

In some embodiments of the electronic device, the electronic device is further configured to execute a next iteration for the given batch of requests including the given request and the target request from the queue.

In some embodiments of the electronic device, the electronic device is further configured to execute a pre-determined number of iterations for the given batch of requests.

In some embodiments of the electronic device, the electronic device is further configured to stop iterative addition of requests from the queue to the given batch in response to a stopping condition being met.

In some embodiments of the electronic device, the electronic device is further configured to send the given batch of requests to the processing unit for processing.

In some embodiments of the electronic device, the electronic device is further configured to generate a next batch of requests from the queue for processing, and where the next batch of requests excludes requests from the given batch.

In some embodiments of the electronic device, the padding tokens are null tokens.

In some embodiments of the electronic device, the electronic device includes the processing unit.

In some embodiments of the electronic device, the processing unit is at least one of a Central Processing Unit (CPU) and a Graphics Processing Unit (GPU).

In some embodiments of the electronic device, the given request represents a sequence of tokens to be used for training a Deep Neural Network (DNN).

In some embodiments of the electronic device, the given request in the queue represents an input sequence of tokens to be processed by a Sequence-to-Sequence (Seq2Seq) model for generating an output sequence of tokens.

In some embodiments of the electronic device, the DNN is at least one of: a transformer-based model, an End-to-End Convolutional Neural Network (E2E-CNN), a Bidirectional Encoder Representations from Transformers (BERT) model, and a Long Short-Term Memory (LSTM) model.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
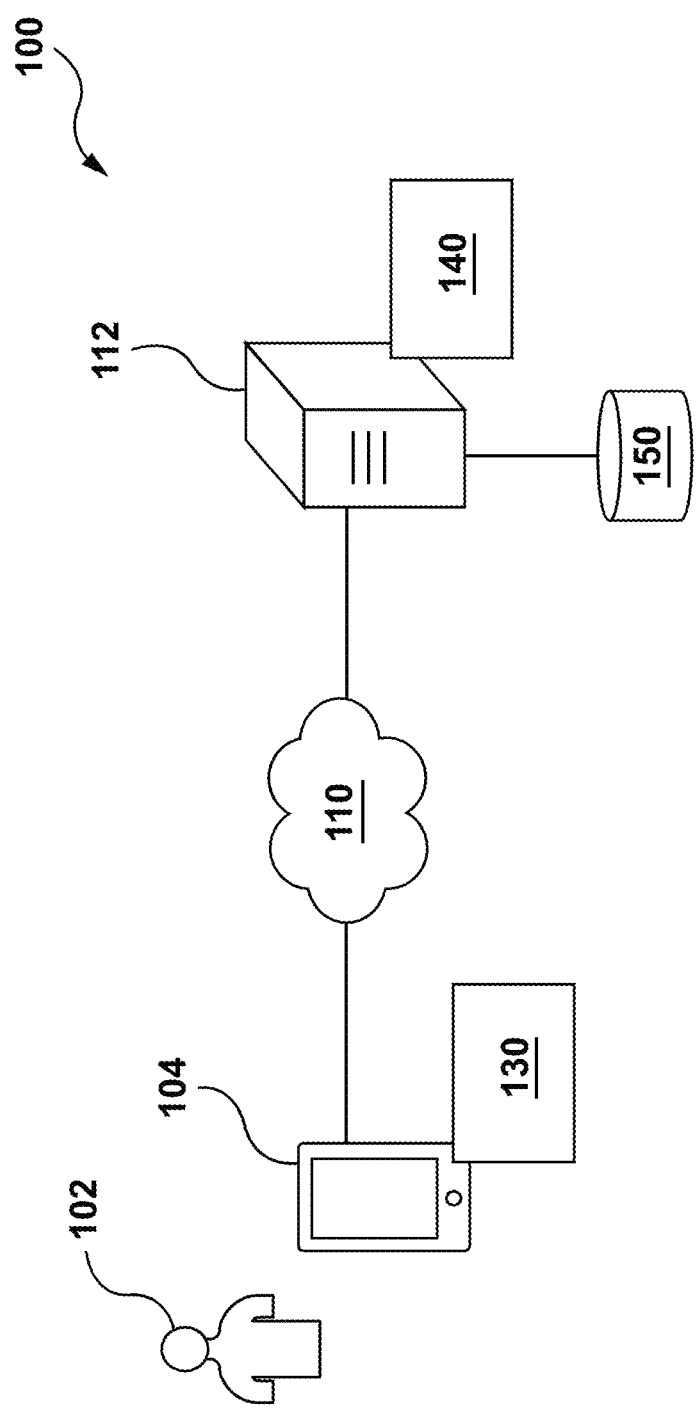
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide computer-implemented services for a user 102 of a user device 104. To that end, the system 100 may be configured to execute a remote machine learned model 120 and/or a local machine learned model 130. How machine learned models may be implemented in some embodiments of the present technology will be discussed in greater details herein further below. At least some components of the system 100 will now be described, however, it should be understood that other components to those depicted in FIG. 1 may be part of the system 100 without departing from the scope of the present technology.

Communication Network

The user device 104 is communicatively coupled to a communication network 110 for communication with the server 112. For example, the user device 104 may be communicatively coupled with the server 112 via the communication network 110 for providing the user 102 with the translation services. The communication network 110 is configured to transmit inter alia requests and responses between the user device 104 and the server 112 in a form of one or more data packets comprising communication data.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the user device 104 and the communication network 110 is implemented will depend inter alia on how the user device 104 is implemented.

Merely as an example and not as a limitation, in those embodiments of the present technology where the user device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the user device 104 is implemented as a notebook computer, the communication link can be either wireless (such as Wireless Fidelity, or WiFi® for short, Bluetooth® or the like) or wired (such as an Ethernet based connection).

User Device

The system 100 comprises the user device 104, the user device 104 being associated with the user 102. As such, the user device 104 can sometimes be referred to as a "client device", or "end user device". It should be noted that the fact that the user device 104 is associated with the user 102 does not need to suggest or imply any mode of operation—such as a need to log in, a need to be registered, or the like.

The implementation of the user device 104 is not particularly limited, but as an example, the user device 104 may be implemented as a personal computer (desktops, laptops, netbooks, etc.), a wireless communication device (such as a smartphone, a cell phone, a tablet and the like), as well as network equipment (such as routers, switches, and gateways). The user device 104 comprises hardware and/or software and/or firmware (or a combination thereof), as is known in the art, to execute a browser application.

Generally speaking, the purpose of the browser application is to enable the user 102 to access one or more network resources, such as web pages, for example. How the browser application is implemented is not particularly limited. One example of the browser application may be embodied as a Yandex™ browser.

The user 102 may use the browser application for accessing a translation engine for translating one or more sentences from a source language to a target language. For example, the user device 104 may be configured to generate a request indicative of one or more sentences that the user 102 desires to be translated. Also, the user device 104 may be configured to receive a response (not depicted) for displaying a translated version of one or more sentences in the target language to the user 102.

Server and Database

The system 100 also comprises the server 112 that can be implemented as a conventional computer server. In the depicted non-limiting embodiments of the present technology, the server 112 is a single server. In alternative non-limiting embodiments of the present technology, functionalities of the server 112 may be distributed and may be implemented via multiple servers. The server 112 may include one or more processors, one or more non-transitory memory devices, computer-readable instructions, and/or additional hardware components, additional software components, and/or combination thereof, for implementing various functionalities of the server 112, without departing from the scope of the present technology.

The system 100 also comprises a database 150 which is communicatively coupled to the server 112 and is configured to store information extracted or otherwise determined or generated by the server 112. Generally speaking, the database 150 may receive data from the server 112 which was extracted or otherwise determined or generated by the server 112 during processing for temporary and/or permanent storage thereof and may provide stored data to the server 112 for use thereof. It is contemplated that the database 150 may be split into several distributed databases without departing from the scope of the present technology.

The database 150 may be configured to store data for training and/or using the remote machine learned model 120 and/or the local machine learned model 130.

Generally speaking, the server 112 can be under control and/or management of a translation service provider (not depicted), such as, for example, an operator of Yandex™ online services. It is contemplated that the provider of the online services and the provider of the browser application may be the same provider. For example, the browser application (e.g., Yandex™ browser) and the online services (e.g., Yandex™ online services) may be provided, controlled and/or managed by the same operator or entity.

Machine Learned Models

As alluded to above, the server 112 may execute the remote machine learned model 120 and the user device 104 may execute the local machine learned model 130. It is contemplated that the remote machine learned model 120 may be used for remotely processing data for the user 102 (on the server 112). It is also contemplated that the local machine learned model 130 may be used for locally processing data for the user 102 (on the user device 104).

In the context of the present technology, a given machine learned model is implemented as a Deep Neural Network (DNN). Broadly speaking, a DNN is an artificial neural network with multiple layers between the input and output layers and which consist of the following components: neurons, synapses, weights, biases, and functions. Some non-limiting examples of DNNs include, but are not limited to: feedforward DNNs, Recurrent Neural Networks (RNNs), Long Short-Term Memory (LSTM), Convolutional Neural Networks (CNNs), transformer-based models, and so forth. Such a DNN may be used by the user device 104 and/or the server 112 in a variety of applications such as, but not limited to: text translation, speech synthesis, speech recognition, natural language processing, computer vision, and so forth.

It can be said that the system 100 comprises an electronic device, such as the server 112 and/or the user device 104, that is configured to execute a DNN, such as the remote machine learned model 120 and/or the local machine learned model 130, for a variety of applications.

Electronic Device

Figure 2:
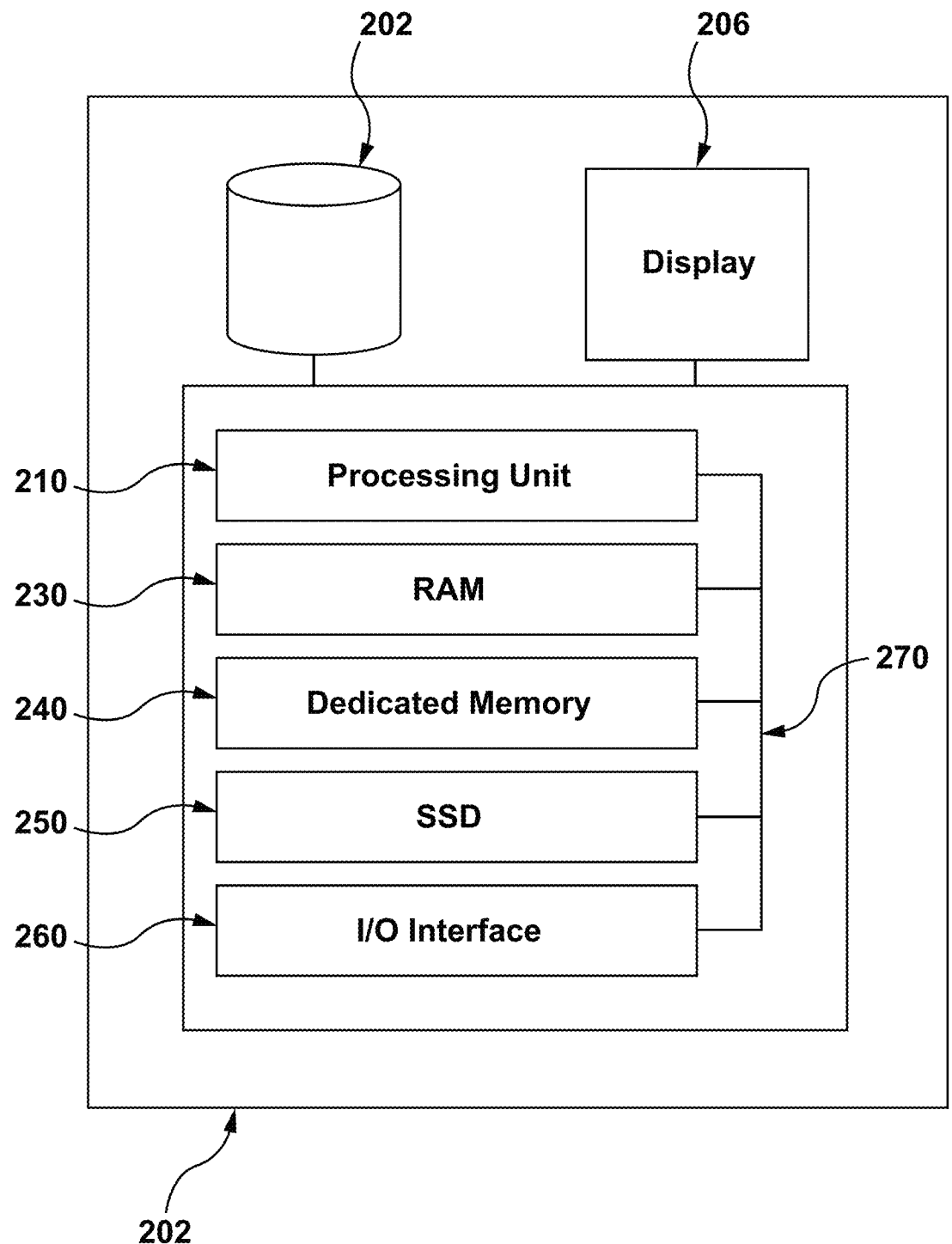
FIG. 2 depicts hardware components of an electronic device, including a processing unit, suitable for use in at least some non-limiting embodiments of the present technology.

FIG. 2 is a schematic representation of an electronic device 200 in accordance with an embodiment of the present technology. In some embodiments of the present technology, the user device 104 may be implemented as the electronic device 200. In other embodiments of the present technology, the server 112 may be implemented as the electronic device 200.

Alternatively or additionally, the electronic device 200 may be implemented by any of a conventional personal computer, a controller, and/or an electronic device (e.g., a server, a controller unit, a control device, a monitoring device etc.) and/or any combination thereof appropriate to the relevant task at hand.

In some other embodiments, the electronic device 200 may be an "off the shelf" generic computer system. In some embodiments, the electronic device 200 may also be distributed amongst multiple systems. The electronic device 200 may also be specifically dedicated to the implementation of the present technology. As a person in the art of the present technology may appreciate, multiple variations as to how the electronic device 200 is implemented may be envisioned without departing from the scope of the present technology.

In the illustrated non-limiting example, the electronic device 200 comprises a variety of hardware components comprising a processing unit 210, a solid-state drive 150, a RAM 130, a dedicated memory 140, an input/output interface 160, and buses 170.

The processing unit 210 may be a general-purpose processor, such as a Central Processing Unit (CPU) or a specialized processor dedicated to a specific purpose, such as a Graphics Processing Unit (GPU). It is contemplated that the electronic device 200 may comprise any combination of one or more CPUs and one or more GPUs without departing from the scope of the present technology.

Broadly speaking, a CPU, also called a central processor, is the electronic circuitry that executes instructions comprising a computer program. The CPU performs basic arithmetic, logic, controlling, and input/output (I/O) operations specified by the instructions in the program. The form, design, and implementation of CPUs have changed over time. Some example components of a CPU include the arithmetic logic unit (ALU) that performs arithmetic and logic operations, processor registers that supply operands to the ALU and store the results of ALU operations, and a control unit that orchestrates the fetching (from memory), decoding and execution of instructions by directing the coordinated operations of the ALU, registers and other components. Further, CPUs can be implemented on integrated circuit (IC) microprocessors, with one or more CPUs on a single metal-oxide-semiconductor (MOS) IC chip. Microprocessors chips with multiple CPUs are sometimes referred to as multi-core processors. The individual physical CPUs, processor cores, can also be multithreaded to create additional virtual or logical CPUs.

Broadly speaking, a GPU is a specialized electronic circuit designed to rapidly manipulate and alter memory to accelerate the creation of images in a frame buffer intended for output to a display device. GPUs are used in embedded systems, mobile phones, personal computers, workstations, and game consoles. It should be noted that GPUs are very efficient at manipulating computer graphics and image processing. Their highly parallel structure can make them more efficient than general-purpose CPUs for algorithms that process large blocks of data in parallel. In a personal computer, for example, a GPU can be present on a video card or embedded on the motherboard.

Akin to CPUs, GPUs can be optimized for training artificial intelligence and deep learning models as they can process multiple computations simultaneously. They can have a large number of cores, which allows for better computation of multiple parallel processes. Additionally, computations in deep learning need to handle huge amounts of data—this makes a GPU's memory bandwidth most suitable. There are a few deciding parameters to determine whether to use a CPU or a GPU to train a deep learning model, including memory bandwidth, dataset size, task optimization, and the like. It can be said that the electronic device 200 including the processing unit 210 (e.g., one or more CPUs and/or one or more GPUs) may be a computer system configured to operate a machine learning algorithm (MLA) and/or deep learning algorithms (DLA).

Communication between the various components of the electronic device 200 may be enabled by one or more internal and/or external buses 270 (e.g. a PCI bus, universal serial bus, IEEE 1394 "Firewire" bus, SCSI bus, Serial-ATA bus, ARINC bus, etc.), to which the various hardware components are electronically coupled.

The input/output interface 260 may provide networking capabilities such as wired or wireless access. As an example, the input/output interface 260 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 250 stores program instructions suitable for being loaded into the RAM 230 and executed by the processor 110. Although illustrated as a solid-state drive 250, any type of memory may be used in place of the solid-state drive 250, such as a hard disk, optical disk, and/or removable storage media.

Further, the electronic device 200 may include a screen or display 206 capable of rendering images. In some embodiments, the display 206 may be used to display Graphical User Interfaces (GUIs), program output, etc. In some embodiments, display 206 may comprise and/or be housed with a touchscreen to permit users to input data via some combination of virtual keyboards, icons, menus, or other Graphical User Interfaces (GUIs). In Some embodiments, display 206 may be implemented using a Liquid Crystal Display (LCD) display or a Light Emitting Diode (LED) display, such as an Organic LED (OLED) display. In other embodiments, display 206 may remotely communicably connected to the electronic device 200 via a wired or a wireless connection (not shown), so that outputs of the electronic device 200 may be displayed at a location different from the location of the electronic device 200. In this situation, the display 206 which may be operationally coupled to, but housed separately from, other functional units and systems in the electronic device 200.

The electronic device 200 may comprise a memory 202 configured to store data. The memory 202 may be embedded in the electronic device 200 as in the illustrated embodiment of FIG. 2 or located in an external physical location. The electronic device 200 may be configured to access a content of the memory 202 via a network (not shown) such as a Local Area Network (LAN) and/or a wireless connexion such as a Wireless Local Area Network (WLAN).

The electronic device 200 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Queue of Requests

Figure 3:
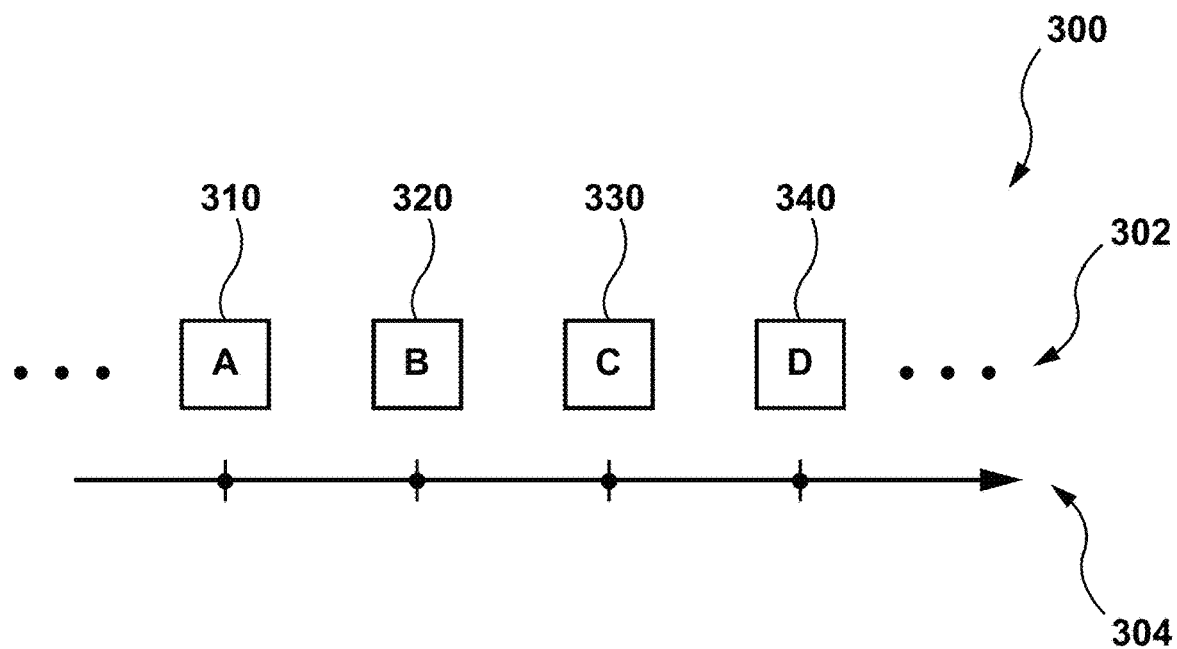
FIG. 3 depicts a queue of requests for processing by the processing unit of FIG. 2, as envisioned in some non-limiting embodiments of the present technology.

With reference to FIG. 3, there is depicted a schematic representation 300 of a queue 302 of requests to be processed by the processing unit 210 of the electronic device 200. It should be noted that when an input is provided to the DNN executed by the electronic device 200, a request for processing is generated and may be queued for processing by the processing unit 210. Such inputs for the DNN may be provided during a training phase thereof for training purposes, and during an in-use phase thereof for the actual use of the DNN.

The queue 302 comprises requests 310, 320, 330, and 340. The requests in the queue 302 are ordered in time. A timeline 304 is shown for illustrating this ordering of the requests in the queue 302. It is contemplated that the requests in the queue 302 may be associated with respective timestamps. Although not illustrated, the queue 302 of requests may comprise requests that precede the request 310 and/or that are sequence to the request 340 without departing from the scope of the present technology.

A given request in the queue 302 comprises one or more tokens that are to be processed by the processing unit 210. Broadly speaking, a given input into the DNN can be a respective sequence of input "tokens". The nature of these tokens depends on inter alia the architecture of the DNN and the specific application for which this DNN is employed.

Irrespective of a specific application, it can be said that a given token inputted into the DNN is in a sense a "unit of processing" for the DNN. It should also be noted that DNNs may be configured to receive inputs of different lengths, meaning that two different inputs into DNN may have different numbers of input tokens.

It should be noted that a number of tokens in the given request defines a length of the given request. This means that a first request and a second request in the queue 302 may have a different number of tokens, and therefore distinct lengths. For example, the first request (a given input for the DNN) in the queue 302 may have five (5) tokens, while the second request (an other given input for the DNN) in the queue 302 may have seven (7) tokens.

It is contemplated that requests in the queue 302 are "indivisible" requests, meaning that the number of tokens included in the given request are to be processed as a whole by the processing unit 210, and cannot be in a sense "split" into two or more sub-requests, since they represent a common input into the DNN.

Developers of the present technology have realized that grouping requests from a queue and providing them to the processing unit in "batches" may reduce the total processing time of these requests by the processing unit. Therefore, the electronic device 200 is configured to generate one or more such batches of requests to be provided to the processing unit 210 for processing. In other words, the electronic device 200 may be configured to perform one or more batching operations on the requests in the queue 302 so as to generate respective batches of requests.

The generation of a given batch of requests is an iterative process. This means that when forming a given batch, the electronic device 200 is configured to iteratively add requests to a current batch based on one or more rules. As such, it can be said that with every iteration of the iterative process, an additional request from the queue 302 is added to the then-current number of requests in the batch.

In some embodiments of the present technology, the electronic device 200 may be configured to execute a pre-determined number of iterations for forming a given batch of requests. In these embodiments, it can be said that a total number of requests in a given batch may be pre-determined.

In other embodiments of the present technology, the electronic device 200 may be configured to stop iterative addition of requests to a given batch in response to other types of stopping conditions being met. For example, the stopping condition may be a pre-determined maximal length of requests in the given batch. If a current length of requests in the given batch reaches this pre-determined maximal length, the iterative process may be stopped and the batch may be sent for processing. It should be noted that processing time of a given batch may depend more on the length of requests in the given batch than on a total number of requests in the given batch. In another example, the stopping condition may be a pre-determined total number of "padding" tokens in the given batch that are necessary for ensuring that all requests in the given batch are of the same length. If a current total number of padding tokens in the batch reaches the pre-determined total number of padding tokens, the iterative process may be stopped and the batch may be sent for processing.

It should also be noted that requests in a given batch must have a same length when sent for processing. In other words, a given batch to be provided to the processing unit 210 for processing must not have requests of different lengths. Due to a variety of actual lengths of requests in the queue 302, the electronic device 200 may be configured to add to some requests "padding tokens" for ensuring that all requests in the given batch have a same length.

For example, let it be assumed that the electronic device 200 is to add a first request from the queue 302 that has a length of five (i.e., has five tokens) to a batch that already includes other requests having a length of seven (i.e., seven tokens respectively). In such a case, the electronic device 200 may be configured to attach two (2) padding tokens to the first request when adding the first request to the batch for ensuring that its length is the same as the length of the other requests already included in the batch. In is contemplated that padding tokens may be null tokens that are added by the electronic device 200 to requests in a given batch for ensuring that all requests in the given batch share the same length.

In some embodiments of the present technology, the electronic device 200 may be configured to perform a pair-wise comparison of candidate requests during each iteration of a batch generation process. In other words, the electronic device 200 may be configured to compare a cost of adding a first candidate request to a given batch against the cost of adding a second candidate request to the given batch, and make a determination about which of the two candidate requests is to be added to the given batch during a current iteration of the batching process.

How the electronic device 200 may be configured to perform selective addition of a given one amongst two candidate requests to a given batch during a current iteration of the batching process will now be described with reference to both FIGS. 4 and 5.

A given batching process may begin with the electronic device 200 selecting a first request to be included into the batch. During this first iteration, the electronic device 200 may not calculate any cost of adding an initial request into the batch. For example, the electronic device 200 may add the oldest request amongst all the requests in the queue 302 as the initial request in the batch. In an other example, the electronic device 200 may add a shortest one amongst all the requests in the queue 302 as the initial request in the batch.

Let it be assumed that at a moment in time when the electronic device 200 is beginning a current iteration of the batching process, the electronic device 200 has formed a batch 410. At the current iteration, the electronic device 200 may be configured to determine which one amongst the request 310 and the request 320 from the queue 302 is to be added to the batch 410 (current version thereof).

To that end, the electronic device 200 is configured to input into a cost function 402, current parameters of the batch 410, as well as parameters of the request 310 and of the request 320. For example, parameters of the batch 410 may include, but are not limited to: a current size of the batch 410 indicative of a current number of requests in the batch 410, and a current length of the batch 410 indicative of a current length of requests that is shared by all requests. In the same example, parameters of the request 310 and of the request 320 may include, but are not limited to, a length of the request 310 and the length of the request 320 indicative of how many tokens are included in the request 310 and the request 320, respectively.

The cost function 402 is configured to use such inputs for generating a cost value 420 for the request 310 and a cost value 430 for the request 320. It should be noted that the cost value 420 associated with the request 310 is indicative of a number of padding tokens that are to be added to the batch 410 for ensuring that all requests in the batch 410 have a same length if the request 310 (first candidate) is added to the batch 410. Also, the cost value 430 associated with the request 320 is indicative of a number of padding tokens that are to be added to the batch 410 for ensuring that all requests in the batch 410 have a same length if the request 320 (second candidate) is added to the batch 410.

It should be noted that, when adding a request at the current iteration to the batch 410, three scenarios are possible.

First Scenario

In a first scenario, the request to be added may have the same length as the current length of the batch 410. In this first scenario, no padding tokens need to be added to the batch 410 at the current iteration. As a result, in this first scenario, a cost value associated with adding such a request to the batch 410 at the current iteration is null.

Figure 5:
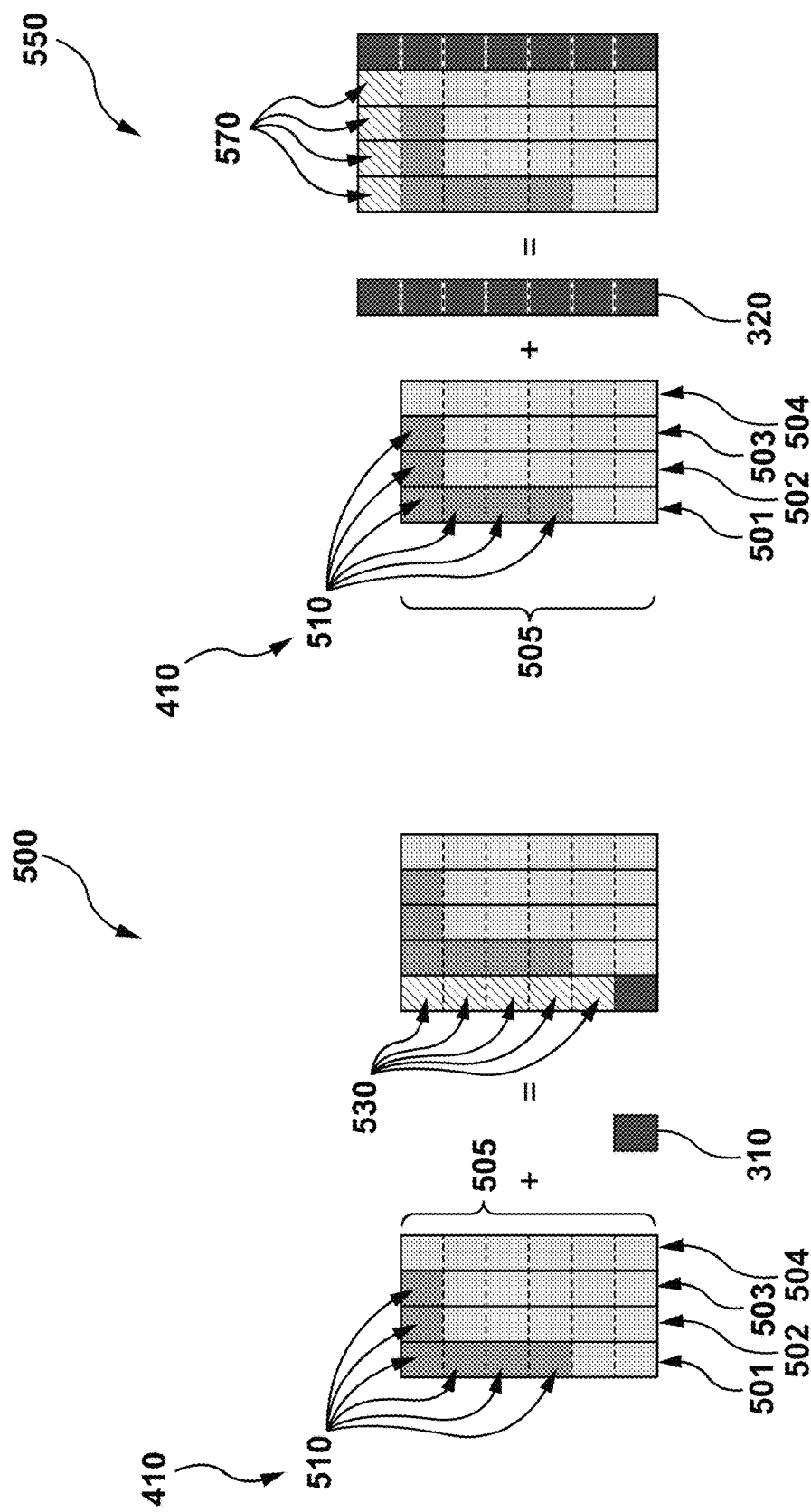
FIG. 5 depicts two scenarios of computing a cost by the cost function of FIG. 4, as envisioned in some non-limiting embodiments of the present technology.

With reference to FIG. 5, there is depicted a representation 500 of a second possible scenario and a representation 550 of a third possible scenario.

As illustrated, let it be assumed that the batch 410 currently has a size of four, meaning that it currently includes four requests, namely requests 501, 502, 503, and 504. Also as illustrated, let it be assumed that the batch 410 currently has a length 505 that is equal to six (6), meaning that all requests currently included in the batch 410 have a length of six (6). It should also be noted that the batch 410 currently includes padding tokens 510 having been added to the batch 410 at previous iterations for ensuring that all the requests in the batch have the same length. For example, a single padding token has been previously added to the request 502 and to the request 503, and four (4) padding tokens have been previously added to the request 501, making all requests in the batch 410 have the same length 505 of six (6) tokens.

Second Scenario

In the second scenario, let it be assumed that the electronic device 200 is to determine the cost value 420 of adding the request 310 to the batch 410 at the current iteration and that the request 310 has a length of one (1), meaning it has only a single token. In this second scenario, the candidate request 310 has a length that is shorter than the current length 505 of the batch 410. In this second scenario, the cost function 402 may determine that five (5) padding tokens 530 need to be added to the batch 410 (and more particularly to the first candidate request 310) for ensuring that all requests in the batch 410 have a same length if the first candidate request 310 is added to the batch 410.

It can be said that in this second scenario where the length of a given candidate request is shorter than the current batch length (length 505), the cost function 402 may determine that a cost value for adding this given candidate at a current iteration is equal to a difference between the length of the first candidate request and the current batch length (e.g., 6−1=5).

In some embodiments of the present technology, the cost function 402 may employ the following equation if the length of a given candidate request is shorter than the current batch length:

$$\text{Cost} = L\max - Li \text{ if } Li < L\max. \quad (1)$$

wherein Lmax is a current length of requests in the given batch, and Li is the length of a candidate request i.

Third Scenario

In the third scenario, let it be assumed that the electronic device 200 is to determine the cost value 430 of adding the request 320 to the batch 410 at the current iteration and that the request 320 has a length of seven (7), meaning it has seven (7) tokens. In this third scenario, the candidate request 320 has a length that is longer than the current length 505 of the batch 410. In this third scenario, the cost function 402 may determine that four (4) padding tokens 570 are to be added to the batch 410 (and more particularly one padding token to each one of the requests currently included in the batch 410) for ensuring that all requests in the batch 410 have a same length if the second candidate request 320 is to be added to the batch 410.

It can be said that in this third scenario where the length of a given candidate request is longer than the current batch length (length 505), the cost function 402 may determine that a cost value of adding this given candidate at the current iteration is equal to a difference between the length of the given candidate and the current batch length multiplied by a current number of requests in the given batch (e.g., (7−6)*4=4).

In some embodiments of the present technology, the cost function 402 may employ the following equation if the length of a given candidate request is longer than the current batch length:

$$\text{Cost} = (Li - L\max)*B \text{ if } Li > L\max. \quad (2)$$

wherein Lmax is a current length of requests in the given batch, and Li is the length of a candidate request i, and B is a current number of requests in the given batch.

Figure 4:
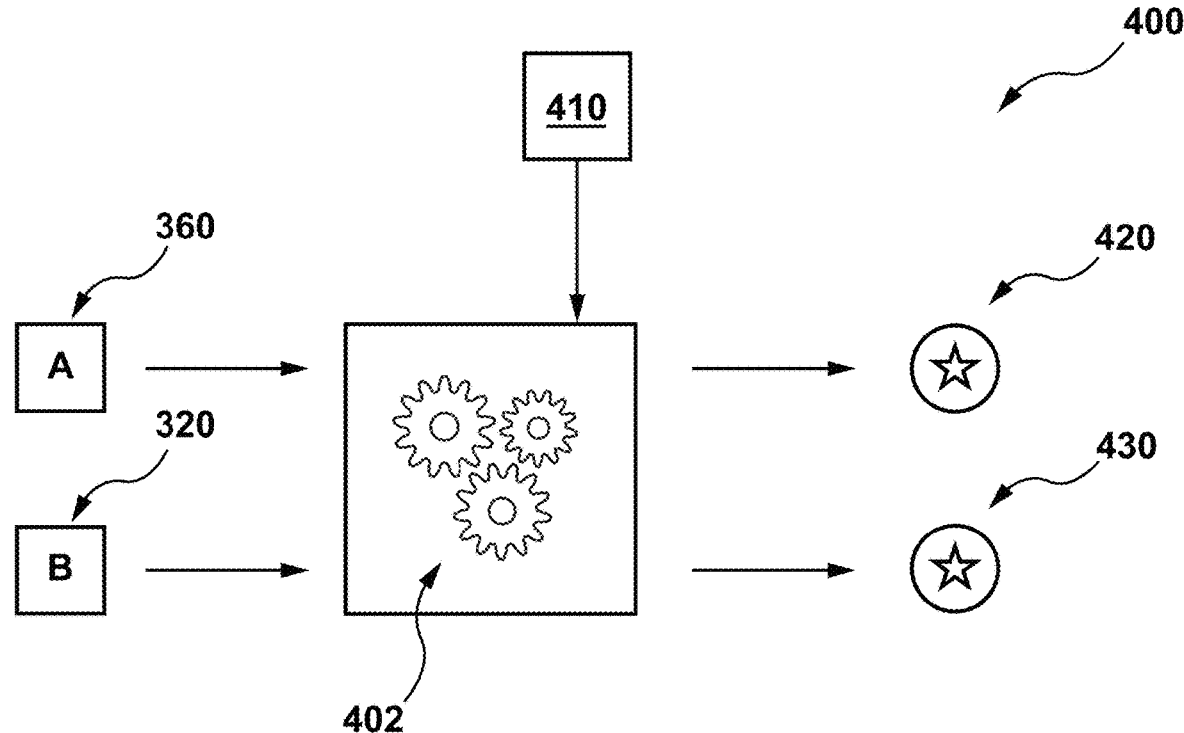
FIG. 4 is a schematic diagram of a cost function executable by the electronic device of FIG. 2, as envisioned in some non-limiting embodiments of the present technology.

Returning to the description of FIG. 4, the cost function 402 may determine that the cost value 420 of adding the candidate request 310 to the batch 410 at the current iteration is "5" (a total number of the padding tokens 530) and that the cost value 430 of adding the candidate request 320 to the batch 410 at the current iteration is "4" (a total number of the padding tokens 570).

In this example, the electronic device 200 may be configured to selectively add the candidate request 320 to the batch 410 during the current iteration. As such, the electronic device 200 may add a single padding token to each one of the requests 501, 502, 503, and 504 during the current iteration.

Once the request 320 is added to the batch 410 at the current iteration, the electronic device 200 may determine whether a stopping condition has been met. If so, the iterative process of building the batch 410 is terminated and the current version of the batch 410 is sent to the processing unit 210 for processing. If not, the electronic device 210 may be configured to perform a similar comparison between the candidate request 310 and an other candidate request (such as request 330 and 340) and/or between an other pair of candidate requests excluding the candidate request 310. However, it should be noted that during this next iteration, updated parameters for the batch 410 are used for determining the cost values for the corresponding pair of candidate requests used during the next iteration.

Figure 6:
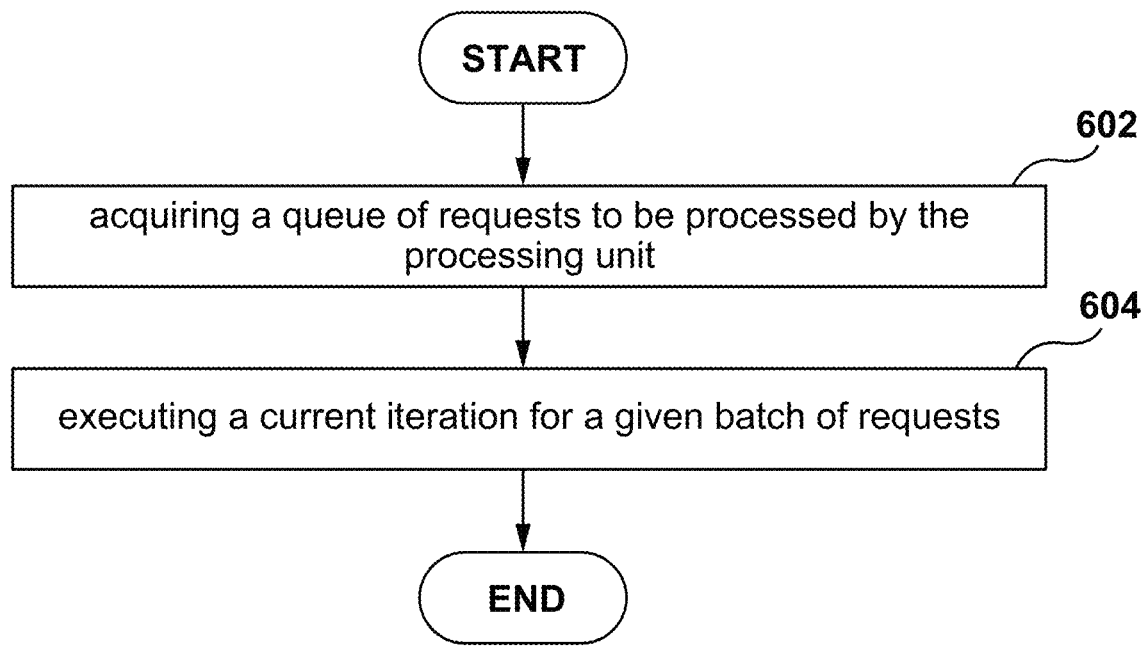
FIG. 6 is a flowchart of a method executable in accordance with certain non-limiting embodiments of the present technology.

In some embodiments of the present technology, the electronic device 200 may be configured to execute a computer-implemented method 600 the flow-chart of which is depicted in FIG. 6. Various steps of the method 600 will now be discussed.

Step 602: Acquiring a Queue of Requests to be Processed by the Processing Unit The method 600 begins with the electronic device 200 acquiring the queue 302 of requests to be processed by the processing unit 210. It should be noted that when an input is provided to a DNN executed by the electronic device 200, a request for processing is generated and may be queued for processing by the processing unit 210. Such inputs for the DNN may be provided during a training phase thereof for training purposes, and during an in-use phase thereof for the actual use of the DNN.

A given request in the queue 302 comprises one or more tokens that are to be processed by the processing unit 210.

Broadly speaking, a given input into the DNN can be a respective sequence of input "tokens". The nature of these tokens depends on inter alia the architecture of the DNN and the specific application for which this DNN is employed.

Irrespective of a specific application, it can be said that a given token inputted into the DNN is in a sense a "unit of processing" for the DNN. It should also be noted that DNNs may be configured to receive inputs of different lengths, meaning that two different inputs into DNN may have different numbers of input tokens.

It should be noted that a number of tokens in the given request defines a length of the given request. This means that a first request and a second request in the queue 302 may have a different number of tokens, and therefore distinct lengths. It is contemplated that requests in the queue 302 are "indivisible" requests, meaning that the number of tokens included in the given request are to be processed as a whole by the processing unit 210, and cannot be in a sense "split" into two or more sub-requests, since they represent a common input into the DNN.

In some embodiments, the given request in the queue 302 represents an input sequence of tokens to be processed by a Sequence-to-Sequence (Seq2Seq) model for generating an output sequence of tokens. In other embodiments, the DNN may be at least one of: a transformer-based model, an End-to-End Convolutional Neural Network (E2E-CNN), a Bidirectional Encoder Representations from Transformers (BERT) model, and a Long Short-Term Memory (LSTM) model.

Step 604: Executing a Current Iteration for a Given Batch of Requests

The method 600 continues to step 602 with the electronic device 200 configured to execute a current iteration for a given batch of requests. Developers of the present technology have realized that grouping requests from a queue and providing them to the processing unit in "batches" may reduce the total processing time of these requests by the processing unit. Therefore, the electronic device 200 is configured to generate one or more such batches of requests to be provided to the processing unit 210 for processing. In other words, the electronic device 200 may be configured to perform one or more batching operations on the requests in the queue 302 so as to generate respective batches of requests.

The generation of a given batch of requests is an iterative process. This means that when forming a given batch, the electronic device 200 is configured to iteratively add requests to a current batch based on one or more rules. As such, it can be said that with every iteration of the iterative process, an additional request from the queue 302 is added to the then-current number of requests in the batch.

During the current batching iteration, the electronic device 200 may be configured to determine a first cost value of adding a first candidate request from the queue to the given batch. The first cost value is indicative of a number of padding tokens that are to be added to the given batch for ensuring that all requests in the given batch have a same length if the first candidate request is added to the given batch. Similarly, the electronic device 200 may be configured to determine a second cost value of adding a second candidate request from the queue to the given batch. The second cost value being indicative of a number of padding tokens that are to be added to the given batch for ensuring that all requests in the given batch have the same length if the second candidate request is added to the given batch. Then, during the current batching operation, the electronic device 200 may be configured to selectively add a target request amongst the first candidate request and the second candidate request to the given batch. The target request is associated with a lowest one of the first cost value and the second cost value.

In some embodiments of the present technology, the electronic device 200 may be configured to execute a pre-determined number of iterations for forming a given batch of requests. In these embodiments, it can be said that a total number of requests in a given batch may be pre-determined.

In other embodiments of the present technology, the electronic device 200 may be configured to stop iterative addition of requests to a given batch in response to other types of stopping conditions being met. For example, the stopping condition may be a pre-determined maximal length of requests in the given batch. If a current length of requests in the given batch reaches this pre-determined maximal length, the iterative process may be stopped, and the batch may be sent for processing. It should be noted that processing time of a given batch may depend more on the length of requests in the given batch than on a total number of requests in the given batch. In another example, the stopping condition may be a pre-determined total number of "padding" tokens in the given batch that are necessary for ensuring that all requests in the given batch are of the same length. If a current total number of padding tokens in the batch reaches the pre-determined total number of padding tokens, the iterative process may be stopped, and the batch may be sent for processing.

It should also be noted that requests in a given batch must have a same length when sent for processing. In other words, a given batch to be provided to the processing unit 210 for processing must not have requests of different lengths. Due to a variety of actual lengths of requests in the queue 302, the electronic device 200 may be configured to add to some requests "padding tokens" for ensuring that all requests in the given batch have a same length.

In some embodiments, the electronic device 200 may execute a next iteration for the given batch of requests including the given request and the target request from the queue similarly to how the current iteration is performed.

In other embodiments, it can be said that during the given iteration the electronic device 200 may execute a pre-determined number of iterations for the given batch of requests and/or stopping iterative addition of requests from the queue to the given batch in response to a stopping condition being met. In further embodiments, the method 600 may further comprise providing the given batch of requests to the processing unit 210 for processing.

In yet additional embodiments, the electronic device 200 may make use of the queue 302 for generating a next batch of requests, similarly to how the current batch has been generated. The next batch of requests excludes requests from the current batch.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of batching requests for processing by a processing unit, the method being executable by an electronic device, the method comprising:
  acquiring, by the electronic device, a queue of requests comprising a plurality of requests to be processed by the processing unit, each request of the plurality of requests having a respective number of tokens, a given number of tokens defining a length of a given request, the number of tokens in the given request to be processed as a whole by the processing unit, and executing, by the electronic device, a current iteration for a given batch of requests comprising a subset of the plurality of requests, having been previously added to the given batch, each request in the given batch having a same length, the executing the current iteration including:

determining a first cost value of adding a first candidate request from the queue to the given batch,
the first cost value being indicative of a first number of padding tokens that are to be added to either the subset of the plurality of requests or the first candidate request for ensuring that all requests in the given batch have the same length if the first candidate request is added to the given batch;

determining a second cost value of adding a second candidate request from the queue to the given batch,
the second cost value being indicative of a second number of padding tokens that are to be added to either the subset of the plurality of requests or the second candidate request for ensuring that all requests in the given batch have the same length if the second candidate request is added to the given batch; and selectively adding, by the electronic device, a target request amongst the first candidate request and the second candidate request to the given batch,
the target request being associated with a lowest one of the first cost value and the second cost value.

2. The method of claim 1, wherein the given batch has a current batch length during the current iteration, the current batch length being a largest length amongst all requests having been added to the given batch in at least one iteration prior to the current iteration.

3. The method of claim 2, wherein a length of the first candidate request is shorter than the current batch length, the first cost value being equal to a difference between the length of the first candidate request and the current batch length.

4. The method of claim 2, wherein a length of the first candidate request is longer than the current batch length, the first cost value being equal to a difference between the length of the first candidate request and the current batch length multiplied by a current number of requests in the given batch.

5. The method of claim 1, wherein the method further comprises executing a next iteration for the given batch of requests including the given request and the target request from the queue.

6. The method of claim 1, wherein the method further comprises executing a pre-determined number of iterations for the given batch of requests.

7. The method of claim 1, wherein the method further comprises stopping iterative addition of requests from the queue to the given batch in response to a stopping condition being met.

8. The method of claim 1, wherein the method further comprises sending the given batch of requests to the processing unit for processing.

9. The method of claim 8, wherein the method further comprises generating a next batch of requests from the queue for processing, the next batch of requests excluding requests from the given batch.

10. The method of claim 1, wherein the padding tokens are null tokens.

11. The method of claim 1, wherein the electronic device includes the processing unit.

12. The method of claim 1, wherein the processing unit is at least one of a Central Processing Unit (CPU) and a Graphics Processing Unit (GPU).

13. The method of claim 1, wherein the given request represents the given number of tokens to be used for training a Deep Neural Network (DNN).

14. The method of claim 1, wherein the given request in the queue represents the given number of tokens to be processed by a Sequence-to-Sequence (Seq2Seq) model for generating an output sequence of tokens.

15. The method of claim 13, wherein the DNN is at least one of: a transformer-based model, an End-to-End Convolutional Neural Network (E2E-CNN), a Bidirectional Encoder Representations from Transformers (BERT) model, and a Long Short-Term Memory (LSTM) model.

16. An electronic device for batching requests for processing by a processing unit, the electronic device being configured to:

acquire a queue of requests comprising a plurality of requests to be processed by the processing unit,
each request of the plurality of requests having a respective number of tokens, a given number of tokens defining a length of a given request, the number of tokens in the given request to be processed as a whole by the processing unit, and execute a current iteration for a given batch of requests comprising a subset of the plurality of requests, having been previously added to the given batch, each request in the given batch having a same length, to execute the current iteration the electronic device being configured to:

determine a first cost value of adding a first candidate request from the queue to the given batch,
the first cost value being indicative of a first number of padding tokens that are to be added to either the subset of the plurality of requests or the first candidate request for ensuring that all requests in the given batch have the same length if the first candidate request is added to the given batch;

determine a second cost value of adding a second candidate request from the queue to the given batch,
the second cost value being indicative of a second number of padding tokens that are to be added to either the subset of the plurality of requests or the second candidate request for ensuring that all requests in the given batch have the same length if the second candidate request is added to the given batch; and selectively add a target request amongst the first candidate request and the second candidate request to the given batch,
the target request being associated with a lowest one of the first cost value and the second cost value.

17. The electronic device of claim 16, wherein the electronic device is further configured to stop iterative addition of requests from the queue to the given batch in response to a stopping condition being met.

18. The electronic device of claim 16, wherein the electronic device is further configured to send the given batch of requests to the processing unit for processing.

19. The electronic device of claim 16, wherein the electronic device includes the processing unit.

20. The electronic device of claim 16, wherein the processing unit is at least one of a Central Processing Unit (CPU) and a Graphics Processing Unit (GPU).

\* \* \* \* \*